United States Patent [19]

Madhavan et al.

[11] Patent Number: 4,903,188
[45] Date of Patent: Feb. 20, 1990

[54] PULSE WIDTH MODULATED INDUCTIVE LOAD CONTROLLER

[75] Inventors: Suresh Madhavan, Framingham; Adam Cohen, Worcester; Roger Holman, Maynard, all of Mass.

[73] Assignee: Cambridge Aeroflo, Inc., Shirley, Mass.

[21] Appl. No.: 287,124

[22] Filed: Dec. 20, 1988

[51] Int. Cl.⁴ .............................................. H02M 7/48
[52] U.S. Cl. .................................. 363/96; 363/98; 363/132; 363/138
[58] Field of Search ...................... 363/17, 96, 98, 132, 363/136, 137, 138

[56] References Cited

U.S. PATENT DOCUMENTS

| | | | |
|---|---|---|---|
| 4,220,989 | 9/1980 | Perilstein | 363/96 |
| 4,264,952 | 4/1981 | Kurosawa | 363/138 |
| 4,348,719 | 9/1982 | Hicks et al. | 363/98 |
| 4,502,106 | 2/1985 | Glennon | 363/132 |
| 4,507,724 | 3/1985 | Glennon | 363/98 |
| 4,542,451 | 9/1985 | Hucker | 363/132 |
| 4,546,422 | 10/1985 | Okado | 363/137 |
| 4,564,895 | 1/1986 | Glennon | 363/132 |
| 4,733,146 | 3/1988 | Hamby | 363/137 |

Primary Examiner—Patrick R. Salce
Assistant Examiner—Jeffrey Sterrett
Attorney, Agent, or Firm—Joseph S. Iandiorio

[57] ABSTRACT

A pulse width modulated inductive load controller including a load switching circuit having a plurality of switches which are operative in pairs; each pair including first and second switch devices for controlling power to a load. Commutation logic enables various sequential combination of pairs of switch devices and a clock defines the operation period of each sequential combination of switch device pairs. Pulse width modulation circuitry controls the closed time interval of the switch devices during the operation period of each combination of switch device pairs. Transition control circuitry maintains closed at least one of the switch devices in each sequential combination of switch device pairs after the other switch device is opened, thereby assuring that any regenerated current from the previously energized load coils is provided a path to recirculate through the load.

9 Claims, 4 Drawing Sheets

PULSE WIDTH MODULATED INDUCTIVE LOAD CONTROLLER

FIELD OF INVENTION

This invention relates to a load controller, and more particularly to a pulse width modulated inductive load controller which controls regenerated current by providing a path through which the regenerated current may recirculate through the load thereby eliminating regenerated current bursts to the power supply and minimizing its effect on the load controller.

BACKGROUND OF INVENTION

Electronic system manufacturers must provide electrical power to the fans or blowers needed to cool electronic systems as well as to the system itself. The current trend is to convert primary AC voltage to DC voltage at one location within the system. This DC voltage is then bussed throughout the system. From this DC voltage, DC-AC inverters may provide synthesized AC at any voltage and frequency necessary for the fans, blowers or other load devices.

DC-AC inverters or load controllers used to drive such fans or blowers have gone through a number of design changes. In order to drive three phase AC loads, three pairs of switches are required. Each pair is associated with one load coil and comprises an upper and lower switch device. The switch devices are operated in sequence so that an upper switch device from one pair is operated with a lower switch device from another pair. Various combinations of upper and lower switch devices are sequentially operated to energize successive sets of load coils establishing the field rotation necessary to drive the load.

Operating such three phase load controllers at 100% duty cycle means that as one pair of switches is turned off, another pair is immediately energized. When controlling an inductive load, this insures that any regenerated current from a previously energized load coil can be recirculated through and dissipate in an adjacent, and currently energized coil. To effect rotational speed reductions, it is necessary to reduce the frequency of the synthesized AC. When applying a reduced frequency to the load, it has been found, however, that operating at 100% duty cycle overdrives the load coils, generating excessive heat which may prematurely burnout the coils.

To eliminate overdriving the load coils or achieve power reductions, the controllers are operated at less than 100% duty cycle. The currently selected and energized combination of switch devices is cycled on and off at a very high frequency, typically between 10k to 40k hertz to provide the desired amount of current to the load coils. This technique is commonly called Pulse Width Modulation or PWM. However, the turning off of a pair of switch devices without immediately turning on the next sequential pair eliminates one of the paths through which regenerated current from the previously energized coil may flow. This necessitates providing a shunt path around each switch device to allow for the regenerated current to decay. These shunt paths often consist of large energy storage devices such as capacitors and inductors or large energy dissipative devices such as zener diodes. In addition, the regenerated current can be directed into the power source which must allow for high bursts of currents into its output. Handling these high regenerated current bursts in this manner results in added component costs as well as decreased controller reliability.

SUMMARY OF INVENTION

It is therefore an object of this invention to provide a pulse width modulated inductive load controller which eliminates regenerated current bursts to the power supply.

It is a further object of this invention to provide such an inductive load controller which controls the amount of power applied to a load while providing a path for regenerated current to dissipate and recirculate within the load.

It is a still further object of this invention to provide such an inductive load controller which is inexpensive and highly reliable.

It is a further object of this invention to provide such an inductive load controller which eliminates the need for large energy storage or dissipative devices.

This invention results from the realization that a truly effective and reliable pulse width modulated inductive load controller can be achieved by maintaining closed one switch, from a pair of load coil energizing switches, until such time that it is certain that regenerated current from a previously energized pair of load coils has decayed, to insure that regenerated current from an inductive load may be controlled and recirculated through the load. This invention results from the further realization that the amount of power applied to the load may be controlled by applying the required amount of energy to the load in one energization pulse of sufficient duration, thus eliminating high frequency modulation and related stresses on the load switches, thereby further reducing component ratings and costs.

This invention features a pulse width modulated inductive load controller having a load switching circuit which includes a plurality of switch means, the switch means operative in pairs, and each pair including first and second switch devices for controlling power to a load. Also included are commutation means for enabling various combinations of pairs of switch devices, during a predetermined operation period of each combination of pairs of switch devices. Pulse width modulation means are provided for controlling the closed time interval of the switch devices during the operation period of each combination of switch device pairs. There is transition control means for maintaining closed at least one of the switch devices in each combination of switch device pairs, after the required amount of power has been applied.

In a preferred embodiment, clock means establish the predetermined operation period. The transition control means maintains closed at least one of the switch devices in each sequential combination of switch devices until at least after the regenerated current from the previously energized load has generally discharged.

The switch means may include a unidirectional discharge shunt diode and may also include means for instantaneously sensing the current flowing through the switch device. The pulse width modulation means may also include external load control means for varying the closed interval of each sequential combination of switch device pairs. In addition, the external load control means may vary the operation period defined by the clock means.

The load may include a three phase AC motor or a brushless DC motor. In addition, the load may include a transformer.

DESCRIPTION OF PREFERRED EMBODIMENT

Other objects, features, and advantages will occur from the following description of a preferred embodiment and the accompanying drawings, in which.

A pulse width modulated inductive load controller according to this invention may be accomplished by providing a controller which includes a load switching circuit, a commutator circuit and a transition control circuit. The load switching circuit includes a plurality of load switching devices such as RF 840 Mosfet switches manufactured by International Rectifiers. Each switch device may also include a shunt diode in parallel with the switch device as well as a current monitoring element. In addition, each switch device connected to the positive side of the supply voltage may have an associated level shifter. The level shifter is adapted to transform the low voltage control signal which energizes that switch device to the high voltage level required to control the switch device. Such a level shifter is available as an opto-isolator from General Electric as an H11L3.

The commutation circuit is designed to receive a timing signal and from that signal, generates a sequence of switch device control signals to operate sequential combinations of switch device pairs. Such a commutation circuit is available from LSI Computer Systems as model number LSI-7262.

The transition control circuit receives as input a series of timing signals from the clock/timing circuit. The clock circuit may include a clock generator such as a CD4046 and a Hall effect simulator such as a CD4018. The transition control circuitry includes upper and lower switch ramp generators. These saw tooth ramp generators are synchronized with the clock and may be configured from a NE555 manufactured by National Semiconductor, or may be designed using discrete components. The ramp generators in turn provide input to standard comparators such as LM393.

The transition control circuit is also adapted to receive as input, signals from a pulse width modulation circuit. The pulse width modulation circuit may include a plurality of amplifier and biasing circuits such as LM358. The output of the amplifier and biasing circuits is applied as input to the comparators of the transition control circuit. The output from both the commutator and transition control circuits are combined together in the load switching circuit to provide control of various sequential pairs of switches which in turn enable power to be applied to the load.

Figure 1:
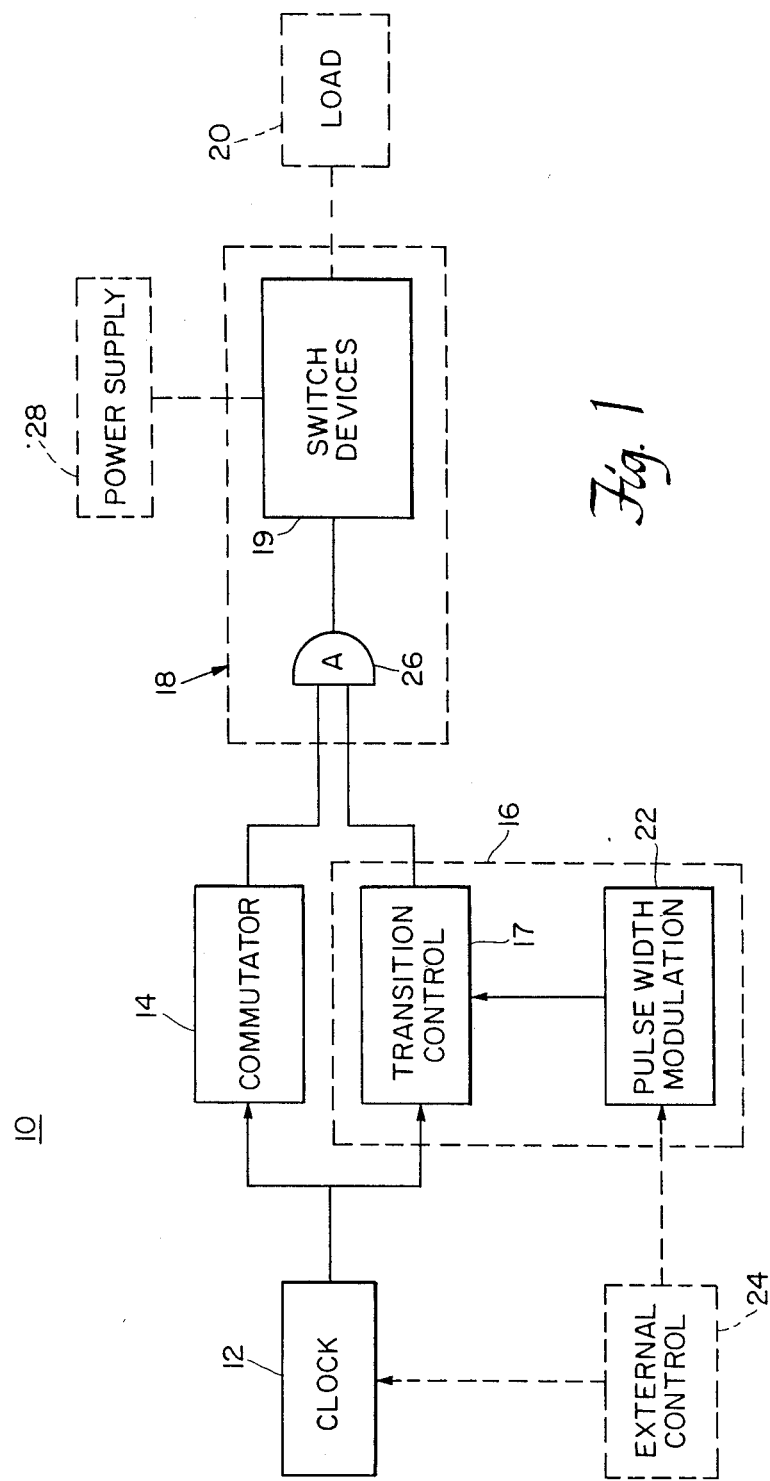
FIG. 1 is a block diagram of a pulse width modulated inductive load controller according to this invention.

Pulse width modulated inductive load controller 10, FIG. 1, includes timing circuit 12 which produces timing signals as input to commutator 14 and transition control logic 16. Transition control logic 16 includes transition control circuit 17 and pulse width modulation circuit 22. Commutator 14 is adapted to sequentially operate various pairs of switch devices 19 located in load switching circuit 18 to apply power to load 20. Transition control circuit 17 combines the input from timing circuit 12 with the information from pulse width modulation circuit 22 to determine how long power will be applied to the load as well as to insure that at least one of switch devices 19 in load switching circuit 18 remains closed to provide a path for regenerated current from the load to recirculate through the load. External control circuit 24 although not part of this invention, may serve to vary the signal supplied by pulse width modulator circuit 22 or may modify timing circuit 12.

The signals from commutator circuit 14 and transition control circuit 17 are combined together by AND circuit 26. The signals from AND circuit 26 supply individual switch control signals to switch devices 19 of load switching circuit 18 which is adapted to switch power from power supply 28, not part of this invention, to load 20, also not a part of this invention.

Figure 2:
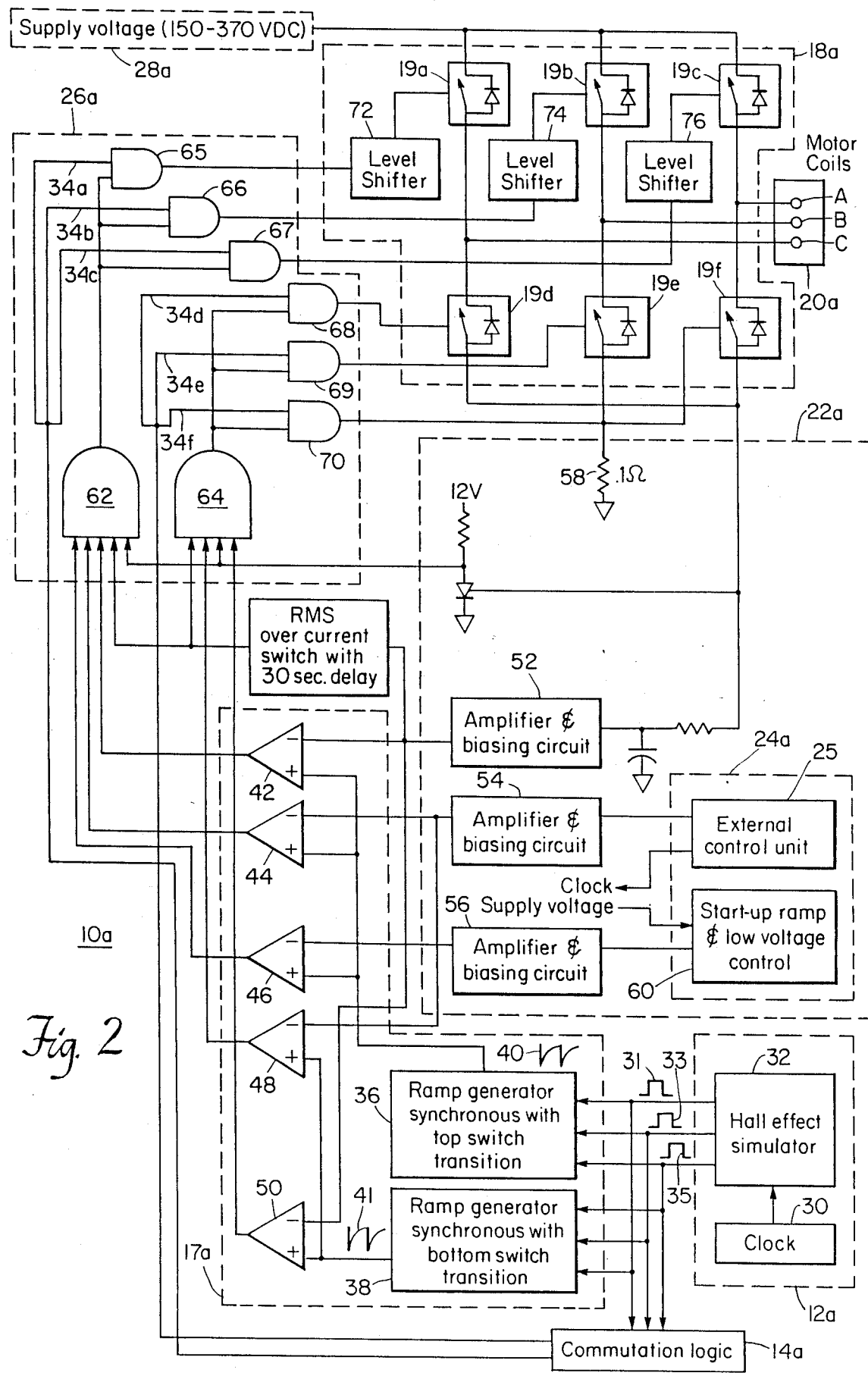
FIG. 2 is a more detailed schematic representation of the inductive load controller of FIG. 1.

One implementation of the pulse width modulated inductive load controller according to this invention is shown as three phase motor controller, 10a, FIG. 2, where like parts are designated by like reference numbers accompanied by a lower case letter. Timing means 12a includes clock 30 which establishes the frequency or period at which the controller operates. In the case of a three phase controller, Hall effect simulator 32 divides the signal from clock 30 into three equal segments representing three 120° phase rotations necessary to operate load coils A, B and C of load 20a.

The three output signals 31, 33 and 35 from Hall effect simulator 32 are applied to commutation logic 14a which produces six individual switch control signals 34a-34f which terminate in AND circuit 26a and more precisely, upper and lower switch AND gates 65-70.

The output from Hall effect simulator 32 is also applied to transition control circuit 17a. Within the transition control circuit, top switch ramp generator 36 and bottom switch ramp generator 38 receive the three phase-shifted signals 31, 33 and 35 from Hall effect simulator 32, and generate saw tooth wave forms 40 and 41 which have one third the frequency as that generated by Hall effect simulator 32 or two times the frequency of clock 30. However, top switch ramp 40 and bottom switch ramp 41 are offset from one another by one-sixth of the period of clock 30, that is by 60°.

Top switch saw tooth ramp 40 is then directed to one input of comparators 42, 44 and 46. Similarly, bottom switch saw tooth ramp 41 is directed to one input of comparators 48 and 50.

The second input for the comparators is generated by pulse width modulation circuit 22a. Pulse width modulation circuit 22a includes amplifier and biasing circuits 52, 54 and 56 which receive input from various stimuli such as current monitoring resistor 58 and external control unit 24a. External control unit 24a may include speed control unit 25 and start up ramp and low voltage control 60.

The output of amplifier and biasing circuits 52, 54 and 56 are applied to the negative inputs of comparators 42-50. As long as the voltage levels of saw tooth ramps 40 and 41 received on the positive input of comparators 42-50 do not exceed the voltage level on the negative input of the comparators from the amplifier and biasing circuits 52, 54 and 56, the output of the comparators remains in a low state thereby disabling AND gates 62 and 64. Once the voltage levels of the ramps exceed that of the biasing circuits, the outputs of the associated comparators change to a high state. This high state or logic (1) condition enables AND gates 62 and 64.

The output from AND gate 62 is directed to upper switch AND gates 65, 66 and 67. Similarly, the output from AND gate 64 is utilized as one input to lower switch AND gates 68, 69 and 70. As long as a logic high is asserted on all of the inputs to AND gate 62, a logic high is also asserted on upper switch AND gates 65–67. A logic high on all of the inputs to AND gate 64 similarly asserts a logic high on one input to lower switch AND gates 68–70. The AND function performed by upper switch AND gates 65–67 and lower switch AND gates 68–70 combines the signals from AND gates 62 and 64 together with commutation logic signals 34a–f to determine which of switch devices 19a–19f of load switching circuit 18a is active thereby switching power from power supply 28a to load coils A, B and C of load 20a. In addition, level shifters 72, 74, and 76 are provided to transform the voltage levels of upper switch AND gates 65–67 from 0–5 V to +300V.

The operation of load switching circuit 18a as well as current flow through the load coils is best illustrated in FIGS. 3A–3D. With respect to conventional current flow with positive current flow into load coils A, B and C indicated by arrows 71a–71c, FIG. 3A, arrow 72, indicates current entering load switching circuit 18a from the positive side of the power supply. The current path is through closed switch device 19a, load coils A and C, exiting to the power supply return in the direction of arrow 74 by means of closed switch device 19f. At the proper moment in time, in response to commutator circuit 14, transition control circuit 17 and pulse width modulation circuit 22, switch device 19f opens, FIG. 3B, thereby interrupting the current path from power supply 28, disconnecting the load from the power supply. After switch 19f is opened, load coil C wants to continue to source current; therefore point 75 jumps from 0 volts to one diode drop above the supply voltage, thereby forward biasing unidirectional discharge shunt diode 76 which is part of switch device 19c. The regenerated current from the load is then recirculated through closed switch 19a into load coil A and back through load coil C. This recirculation continues until the regenerated current has decayed. This transition point is a natural one and occurs when the current in both participating load coils of the three phase load is most likely to be balanced.

Figure 3A:
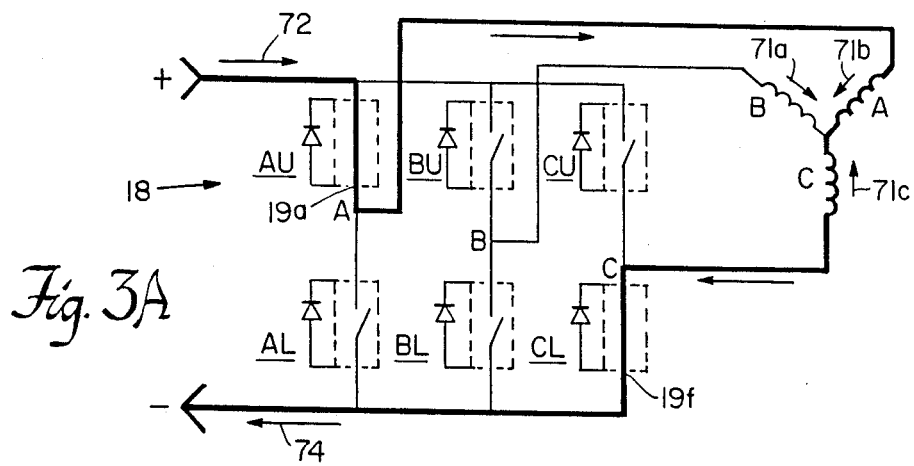
FIGS. 3A-3D are schematic block diagrams illustrating current flow during four successive time periods in the load coils controlled by the inductive load controller of this invention; and, FIG. 4 is a timing and current diagram showing independent and synchronous load coil duty cycling and current during one complete 360° cycle.
Figure 3B:
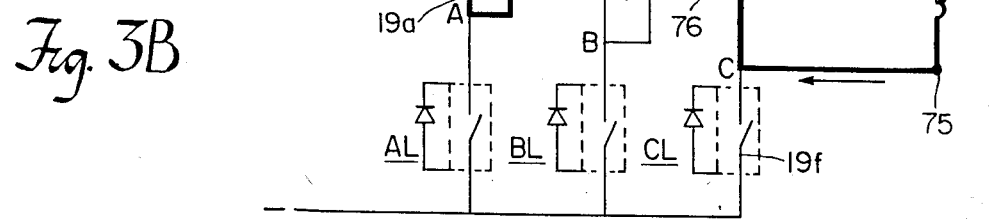
Figure 3C:
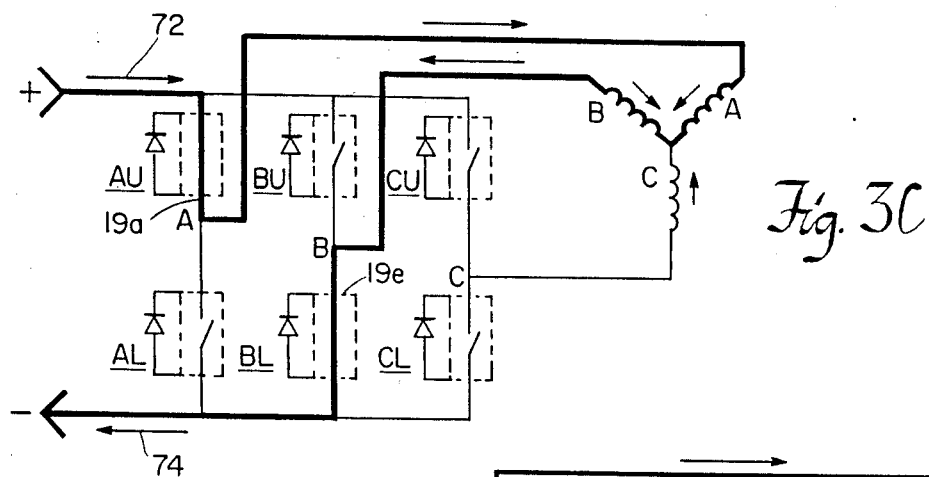
Figure 3D:
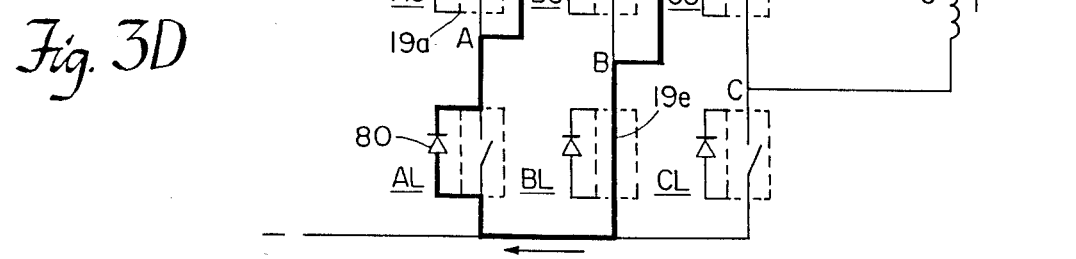

The subsequent commutation sequence may energize switches 19a and 19e, FIG. 3C, allowing current from power supply 28 to flow through load coils A and B as indicated by arrows 72 and 74. At the next sequential transition period, switch 19a is opened, FIG. 3D, thereby interrupting power from power supply 28. Load coil A continues to attempt to sink current; therefore point 78 of load coil A drops one diode drop below 0 volts, forward biasing unidirectional discharge shunt diode 80 and allowing the current to flow from coil A and coil B through closed switch 19e and shunt diode 80 back into coil A. This current recirculation continues until all the regenerated current in the load has dissipated.

Figure 4:
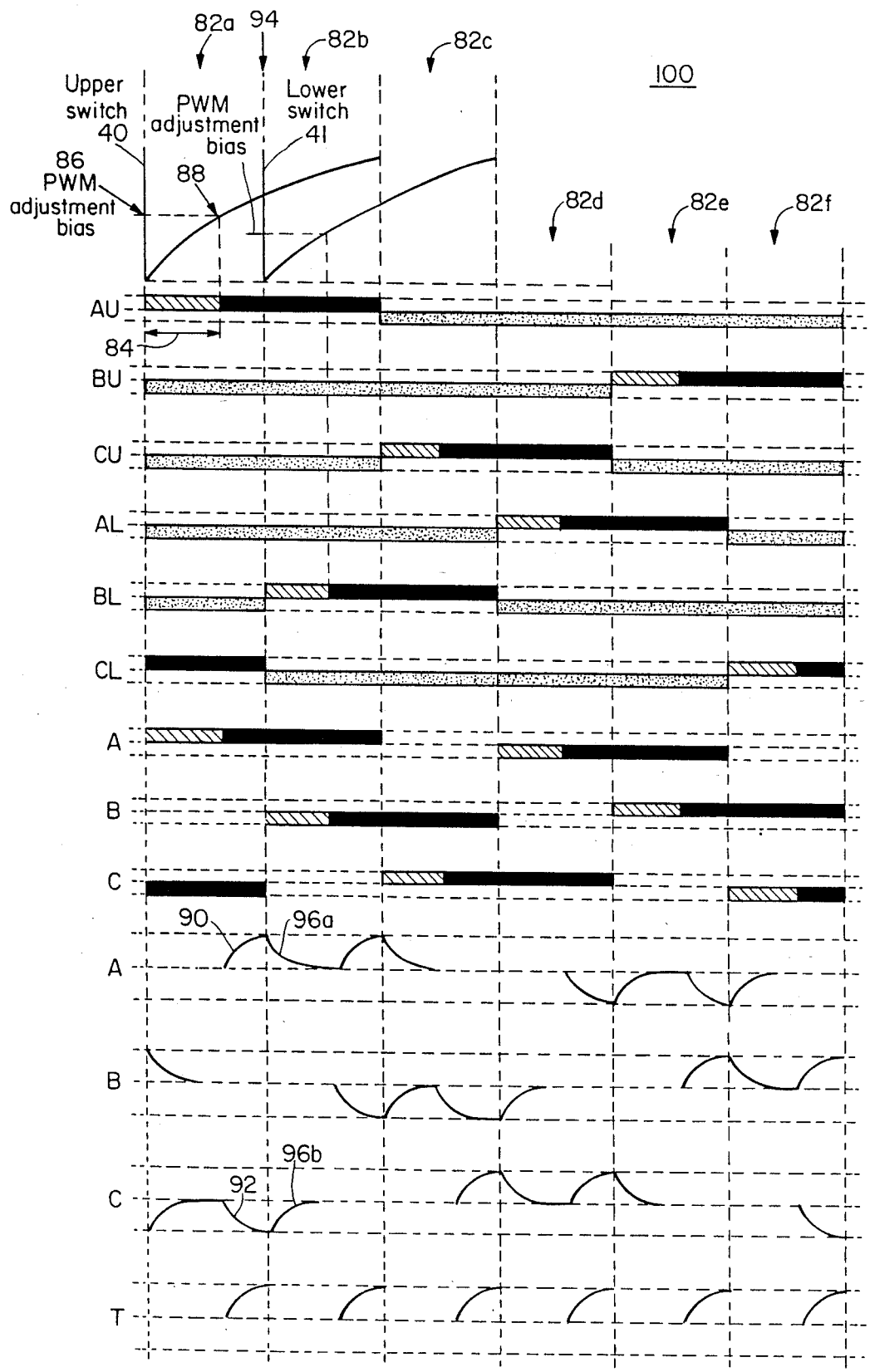

The operation of a three phase pulse width modulated inductive load controller according to this invention may also be illustrated by means of timing diagram 100, FIG. 4. One 360° period of operation is divided into six intervals 82a–f, corresponding to six, sixty degree rotational intervals. During time interval 82a, commutator circuit 14 normally energizes the switch devices associated with the letters "AU" and "CL", corresponding to switches 19a and 19f. However switch AU is disabled by pulse width modulation circuit 22 during the period indicated by arrow 84. During this period, the voltage of upper switch ramp 40 is increasing while the pulse width modulation adjustment bias level on comparators 42–50 of transition control circuit 17 is set to correspond to level 86. Prior to the time when ramp 40 exceeds the pulse width bias adjustment bias level 86, a low level is asserted on AND circuit 62 preventing switch AU from being closed. Once ramp 40 exceeds the pulse width modulation adjustment bias as shown at point 88, switch AU is closed. Since switch CL is also closed, current begins to ramp up at 90 and 92, in coil A and C respectively. Since positive current flow is indicated by current flowing into the central connection point of the three phase load, there appears to be negative current flow through coil C at 92.

At sequence interval 94, commutation logic 14 opens switch CL. However, transition control circuit 17 assures that switch AU remains open and the regenerated current in coils A and C dissipates as shown at 96a and 96b respectively. This sequence repeats itself over and over again with commutation logic 14 energizing various sequential pairs of switch devices during sequences 82b–82f. During the various sequences, transition control circuitry 17 in response to pulse width modulation circuitry 22 determines how long during each respective interval that the switch devices are energized.

Although specific features of the invention are shown in some drawings and not others, this is for convenience only as each feature may be combined with any or all of the other features in accordance with the invention.

Other embodiments will occur to those skilled in the art and are with the following claims:

What is claimed is:

1. A pulse with modulated inductive load controller comprising:
   a load switching circuit including a plurality of switch means, said switch means operative in pairs, each pair including first and second switch devices for controlling power from a power source to a load during a predetermined period;
   commutation means for enabling various sequential combinations of first and second switch devices in different pairs;
   pulse width modulation means for selectively shortening the period during which both of said first and second switch devices are enabled for controlling the amount of power applied to the load; and
   transition control means, responsive to the shortening of the period by said pulse width modulation means, for maintaining closed until after current in the load has generally discharged, one of said first and second switch devices in a sequential combination of switch device pairs, for maintaining a path within the load, and external to the power supply, through which the regenerated current may recirculate and dissipate.

2. The inductive load controller of claim 1 further including clock means for establishing said predetermined period.

3. The inductive load controller of claim 1 in which said load is a motor.

4. The inductive load controller of claim 3 in which said motor includes a three phase AC motor.

5. The inductive load controller of claim 1 further including means for sensing current flow in said switch devices for maintaining closed one of said first and second switch devices in any given combination of switch device pairs until after current flowing in said switch device has generally discharged.

6. The inductive load controller of claim 1 in which said pulse width modulation means includes external load control means for varying said period during which said first and second switch devices are enabled.

7. The inductive load controller of claim 6 in which said external load control varies said predetermined period established by said clock means.

8. The inductive load controller of claim 1 in which said switch means includes at least one regenerated current shunt diode.

9. A pulse width modulated motor control for controlling power to a three phase motor comprising:
- a load switching circuit including three pairs of switch means, each pair including first and second switch devices for controlling power from a power source to said motor during a predetermined period;
- said three phase motor having three load coils, each of said three load coils connected to a respective pair of first and second switch devices;
- each of said switch means including a unidirectional discharge shunt in parallel with said switch devices, for providing a shunt path for regenerated current from the load coils;
- commutation means for enabling sequential combinations of first and second switch devices in different pairs for energizing various combinations of pairs of load coils;
- pulse width modulation means for selectively shortening the period during which both of said first and second switch devices are enabled for controlling the amount of power applied to the selected load coils; and
- transition control means, responsive to the shortening of the period by said pulse width modulation means, for maintaining closed, until after the current in the load coils has generally discharged, one of said first and second switch devices in a sequential combination of switch device pairs, for maintaining a path through the load, and external to the power supply, through which regenerative current from said load coils may recirculate until such time as the regenerated current has generally decayed.

* * * * *